United States Patent
Muramatsu

(10) Patent No.: US 11,113,052 B2
(45) Date of Patent: Sep. 7, 2021

(54) GENERATION APPARATUS, METHOD FOR FIRST MACHINE LANGUAGE INSTRUCTION, AND COMPUTER READABLE MEDIUM

(71) Applicant: FUJITSU LIMITED, Kawasaki (JP)

(72) Inventor: Yuichi Muramatsu, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/580,508

(22) Filed: Sep. 24, 2019

(65) Prior Publication Data

US 2020/0104130 A1   Apr. 2, 2020

(30) Foreign Application Priority Data

Sep. 28, 2018  (JP) .............................. JP2018-184429

(51) Int. Cl.
G06F 9/30   (2018.01)
G06F 9/38   (2018.01)
G06F 8/41   (2018.01)

(52) U.S. Cl.
CPC ............ G06F 9/30014 (2013.01); G06F 8/41 (2013.01); G06F 9/30018 (2013.01); G06F 9/30029 (2013.01); G06F 9/30094 (2013.01); G06F 9/30149 (2013.01); G06F 9/3851 (2013.01)

(58) Field of Classification Search
CPC ............. G06F 9/30014; G06F 9/30018; G06F 9/30029; G06F 9/30034; G06F 9/30149; G06F 9/33851; G06F 9/3851; G06F 8/41
USPC .................................................. 717/136–146
See application file for complete search history.

(56) References Cited

U.S. PATENT DOCUMENTS

| | | | | |
|---|---|---|---|---|
| 5,579,520 A | * | 11/1996 | Bennett | G06F 8/443 717/130 |
| 5,613,117 A | * | 3/1997 | Davidson | G06F 8/433 717/144 |
| 5,774,726 A | * | 6/1998 | Ahmed | G06F 8/42 717/117 |

(Continued)

FOREIGN PATENT DOCUMENTS

| | | |
|---|---|---|
| JP | S59-160245 A | 9/1984 |
| JP | H01-196641 A | 8/1989 |
| JP | 2004-227129 A | 8/2004 |

OTHER PUBLICATIONS

Franco etal, "Automatic Pronunciation Scoring for Language Instruction", IEEE, pp. 1471-1474 (Year: 1997).*

(Continued)

*Primary Examiner* — Anil Khatri
(74) *Attorney, Agent, or Firm* — Fujitsu Patent Center

(57) ABSTRACT

A generation apparatus includes a memory configured to store variable value information indicating variable value candidates for each variable name, and a processor configured to generate a first machine language instruction corresponding to a first code in response to receiving designation of the first code included in codes generated by a compiler, and when the generated first machine language instruction includes a variable name of a specific type, by reference to the variable value information stored in the memory, perform generation of a plurality of machine language instructions based on a plurality of pieces of variable value information associated with each of one or more variable names included in the generated first machine language instruction.

14 Claims, 15 Drawing Sheets

(56) References Cited

U.S. PATENT DOCUMENTS

| | | | | |
|---|---|---|---|---|
| 5,893,145 | A * | 4/1999 | Thayer | G06F 9/3012 711/125 |
| 6,009,505 | A * | 12/1999 | Thayer | G06F 9/30014 708/514 |
| 6,219,457 | B1 * | 4/2001 | Potu | G06T 9/005 341/67 |
| 6,233,732 | B1 * | 5/2001 | Matsuyama | G06F 8/41 717/141 |
| 6,305,009 | B1 * | 10/2001 | Goor | G06F 8/47 717/116 |
| 6,363,523 | B1 * | 3/2002 | Chen | G06F 8/4434 717/153 |
| 6,463,582 | B1 * | 10/2002 | Lethin | G06F 9/45504 717/138 |
| 6,490,673 | B1 * | 12/2002 | Heishi | G06F 9/30036 712/213 |
| 6,573,846 | B1 * | 6/2003 | Trivedi | G06F 9/3004 341/67 |
| 6,658,578 | B1 * | 12/2003 | Laurenti | G06F 5/01 712/244 |
| 6,725,450 | B1 * | 4/2004 | Takayama | G06F 8/443 717/136 |
| 7,114,058 | B1 * | 9/2006 | Trivedi | G06F 9/30014 712/215 |
| 7,373,489 | B1 * | 5/2008 | Brooks | G06F 9/3851 708/495 |
| 7,681,013 | B1 * | 3/2010 | Trivedi | G06F 9/3879 712/7 |
| 8,156,481 | B1 * | 4/2012 | Koh | G06F 11/3466 717/151 |
| 8,555,260 | B1 * | 10/2013 | Kizhepat | G06F 9/30018 717/140 |
| 8,621,448 | B2 * | 12/2013 | Gonion | G06F 8/456 717/157 |
| 8,959,477 | B2 * | 2/2015 | Mueller | G06F 9/45512 717/106 |
| 9,430,197 | B2 * | 8/2016 | Muramatsu | G06F 8/41 |
| 10,496,408 | B2 * | 12/2019 | Yamanaka | G06F 8/45 |
| 2004/0210874 | A1 | 10/2004 | Kageyama et al. | |
| 2004/0268324 | A1 * | 12/2004 | Walker | G06F 9/30112 717/138 |

OTHER PUBLICATIONS

Ratsiambahotra et al, "A Versatile Generator of Instruction Set Simulators and Disassemblers", IEEE, pp. 65-72 (Year: 2009).*

Dias et al, "Automatically Generating Instruction Selectors Using Declarative Machine Descriptions", ACM, pp. 403-416 (Year: 2010).*

Ramsey et al, "Specifying Representations of Machine Instructions", ACM, pp. 492-524 (Year: 1997).*

Power, "A Unified Category Theoretic Approach to Variable Binding", ACM, pp. 1-9 (Year: 2003).*

Wang et al, "Machine Improvisation with Variable Markov Oracle: Toward Guided and Structured Improvisation", ACM, pp. 1-18 (Year: 2016).*

Oi, "On the Design of the Local Variable Cache in a Hardware Translation-Based Java Virtual Machine", ACM, pp. 87-94 (Year: 2005).*

* cited by examiner

FIG. 15A

```
    mov eax, [OPD2]      ···G1
if(MULTOPT =ON) {
    add rcx, 1           ···G2
}
    mov [OPD1], ax       ···G3
```

FIG. 15B

```
mov eax, [OPD2]    ···H1
add rcx, 1         ···H2
mov [OPD1], ax     ···H3
```
257

FIG. 15C

```
mov eax, [OPD2]    ···I1
mov [OPD1], ax     ···I2
```
257

GENERATION APPARATUS, METHOD FOR FIRST MACHINE LANGUAGE INSTRUCTION, AND COMPUTER READABLE MEDIUM

CROSS-REFERENCE TO RELATED APPLICATION

This application is based upon and claims the benefit of priority of the prior Japanese Patent Application No. 2018-184429, filed on Sep. 28, 2018, the entire contents of which are incorporated herein by reference.

FIELD

The embodiment discussed herein is related to a generation technology.

BACKGROUND

In a case where a failure occurs in a compiler for programs, a maintenance personnel verifies whether the failure has an influence on a system in operation based on an occurrence condition of the failure described in a failure report, for example.

Related art is disclosed in, for example, Japanese Laid-open Patent Publication Nos. 2004-227129, 1-196641, and 59-160245.

SUMMARY

According to an aspect of the embodiments, a generation apparatus includes a memory configured to store variable value information indicating variable value candidates for each variable name, and a processor configured to generate a first machine language instruction corresponding to a first code in response to receiving designation of the first code included in codes generated by a compiler, and when the generated first machine language instruction includes a variable name of a specific type, by reference to the variable value information stored in the memory, perform generation of a plurality of machine language instructions based on a plurality of pieces of variable value information associated with each of one or more variable names included in the generated first machine language instruction.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 15A to 15C are diagrams illustrating a comparison between a machine language instruction block in a related example and a machine language instruction block in an embodiment.

DESCRIPTION OF EMBODIMENTS

Figure 1:
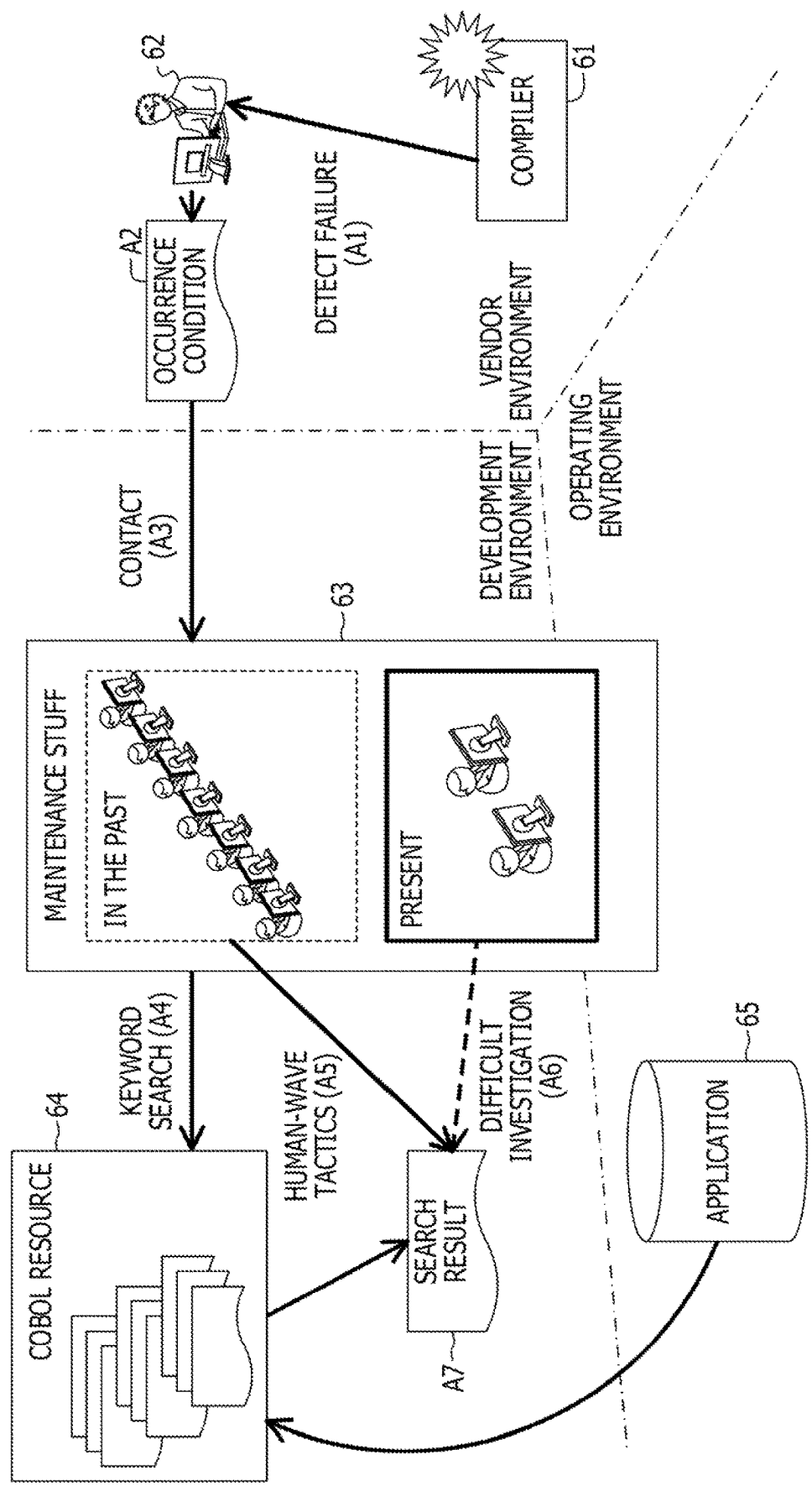
FIG. 1 is a diagram illustrating a first example of a failure investigation for a compiler according to a related example.

When a maintenance personnel receives a simple occurrence condition, the maintenance personnel performs keyword searches to verify an influence on a system in operation. On the other hand, when a maintenance personnel receives a complex occurrence condition, the maintenance personnel verifies logics after executing the keyword searches.

For a program written in a language such as Common Business Oriented Language (COBOL) or Formula Translating System (FORTRAN) the frequency of use of which has been reduced, there is a risk that the logic verification takes time because the number of engineers who may utilize those languages has been reduced.

Hereinafter, an embodiment will be described with reference to drawings. The following embodiment, however, is an example and is not intended to exclude the application of various modifications and techniques that are not clearly described in the embodiment. That is, various modifications and changes may be included in the embodiment without departing from the gist of the embodiment.

The drawings are not intended to illustrate that only the drawn components are provided, but the embodiment may include other functions and so on. Hereinafter, in the drawings, since the same reference numerals denote the same portions, a description thereof will be omitted.

FIG. 1 is a diagram illustrating a first example of a failure investigation for a compiler 61 according to a related example. In a case where a failure in the compiler 61 is detected (see Reference A1) as a result of translation and execution of a program by using the compiler 61 by a user or in a vendor, a compiler developer 62 generates an occurrence condition describing a condition where the failure in the compiler 61 has occurred (see Reference A2). The compiler developer 62 then contacts and passes the generated occurrence condition to a maintenance stuff 63 in a development environment who is developing by using the compiler 61 (see Reference A3).

The maintenance stuff 63 executes keyword searches in a COBOL resource 64 based on the received occurrence condition (see Reference A4). The COBOL resource 64 is extracted from a program in an application 65 in the environment in operation and is written in COBOL language. In the past, because many COBOL engineers have existed, human-wave tactics may be employed to execute the logic verification based on a result of the search through the COBOL resource 64 and decide whether there is a program resource influenced by a failure in the compiler 61 (see References A5 and A7). On the other hand, because there are not sufficient COBOL engineers presently, the execution of the logic verification based on the result of the search through the COBOL resources 64 is difficult (see References A6 and A7).

Figure 2:
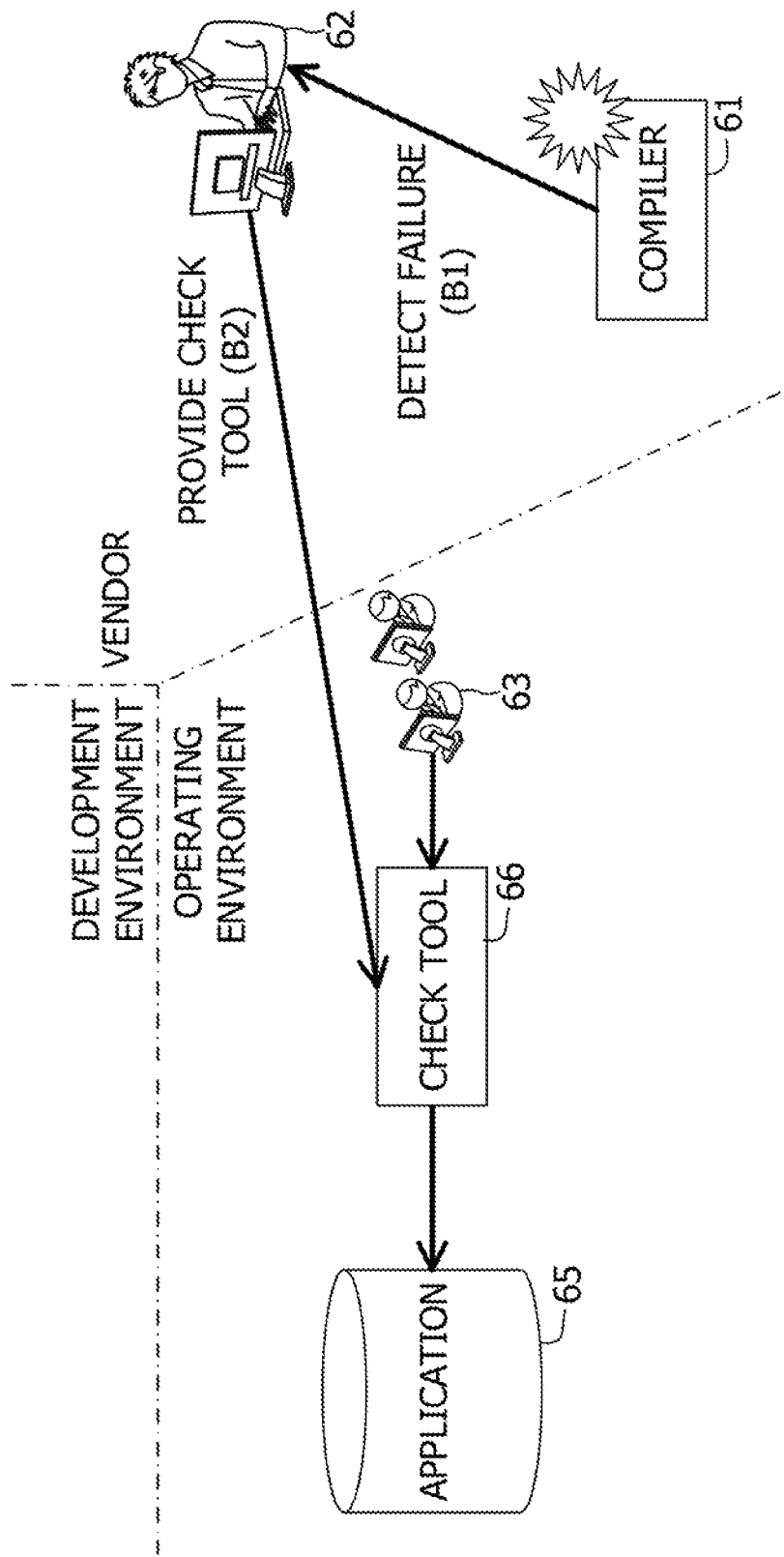
FIG. 2 is a diagram illustrating a second example of a failure investigation for a compiler according to a related example.

FIG. 2 is a diagram illustrating a second example of a failure investigation for the compiler 61 according to a related example. When a failure is detected in the compiler 61 (see Reference B1), the compiler developer 62 investigates a cause of the failure and determines an occurrence condition of the failure. If there is a machine language instruction generated when the failure occurs, the compiler developer 62 provides the maintenance stuff 63 in the operating environment with a check tool 66 for searching the machine language instruction generated correspondingly to the failure to decide whether the application 65 generated by using the compiler 61 is influenced by the failure of the compiler 61 (see Reference B2).

The maintenance stuff 63 searches the machine language instruction in the application 65 by using the provided check tool 66.

Figure 3:
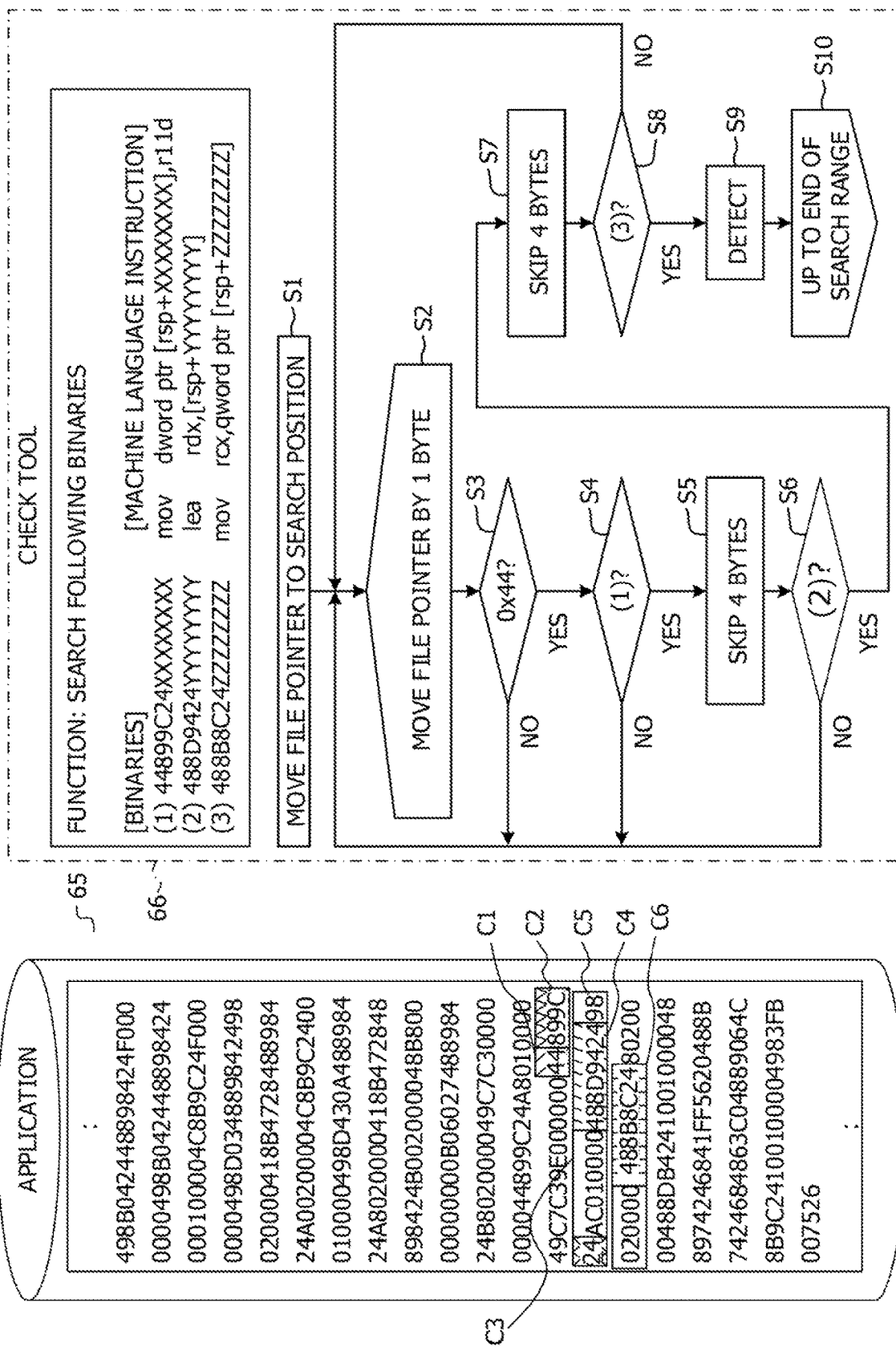
FIG. 3 is a diagram illustrating a search process by using a check tool illustrated in FIG. 2.

FIG. 3 is a diagram illustrating the search process by using the check tool 66 illustrated in FIG. 2. The check tool 66 illustrated in FIG. 3 searches a binary "44899C24XXXXXXXX" corresponding to a machine language instruction "mov dword ptr [rsp+XXXXXXXX], r11d" as a search condition (1). The check tool 66 searches a binary "488D9424YYYYYYYY" corresponding to a machine language instruction "lea rdx,[rsp+YYYYYYYY]" as a search condition (2). Furthermore, the check tool 66 illustrated in FIG. 3 searches a binary "488B8C24ZZZZZZZZ" corresponding to a machine language instruction "mov rcx,qword ptr [rsp+ZZZZZZZZ]" as a search condition (3). "XXXXXXXX", "YYYYYYYY", and "ZZZZZZZZ" are arbitrary binaries.

The check tool 66 moves a file pointer to a search position in the program of the application 65 (step S1).

The check tool 66 moves the file pointer one byte by one byte in the program of the application 65 (step S2).

The check tool 66 decides whether the binary is "0x44" in the program of the application 65 (step S3).

If the binary is not "0x44" (see No route in step S3), the processing returns to step S2.

If the binary is "0x44" (see Yes route in step S3), the check tool 66 decides whether the binary matches "44899C24" of the search condition (1) in the program of the application 65 (step S4). In the example illustrated in FIG. 3, there is the binary "0x44" in the program of the application 65 as indicated by Reference C1.

If the binary does not match the search condition (1) (see No route in step S4), the processing moves to step S2.

If the binary matches the search condition (1) (see Yes route in step S4), the check tool 66 causes the file pointer to skip by four bytes of the arbitrary string "XXXXXXXX" of the condition (1) (step S5). In the example illustrated in FIG. 3, there is the binary "44899C24" of the condition (1) in the program of the application 65 as indicated by Reference C2. In the example illustrated in FIG. 3, a binary "AC010000" is skipped in the program of the application 65 as indicated by Reference C3.

The check tool 66 decides whether the binary matches "488D9424" of the search condition (2) in the program of the application 65 (step S6).

If the binary does not match the search condition (2) (see No route in step S6), the processing returns to step S2.

On the other hand, if the binary matches the search condition (2) (see Yes route in step S6), the check tool 66 causes the file pointer to skip by four bytes of the arbitrary string "YYYYYYYY" of the condition (2) (step S7). In the example illustrated in FIG. 3, there is the binary "488D9424" of the condition (2) in the program of the application 65 as indicated by Reference C4. As indicated by Reference C5, a binary "98020000" is skipped in the program of the application 65.

The check tool 66 decides whether the binary matches "488B8C24" of the search condition (3) in the program of the application 65 (step S8).

If the binary does not match the search condition (3) (see No route in step S8), the processing returns to step S2.

On the other hand, if the binary matches the search condition (3) (see Yes route in step S8), the check tool 66 detects the search target binary (step S9).

Then, the check tool 66 repeatedly executes the processing from step S2 to step S9 up to the end of the search range (step S10).

Figure 4:
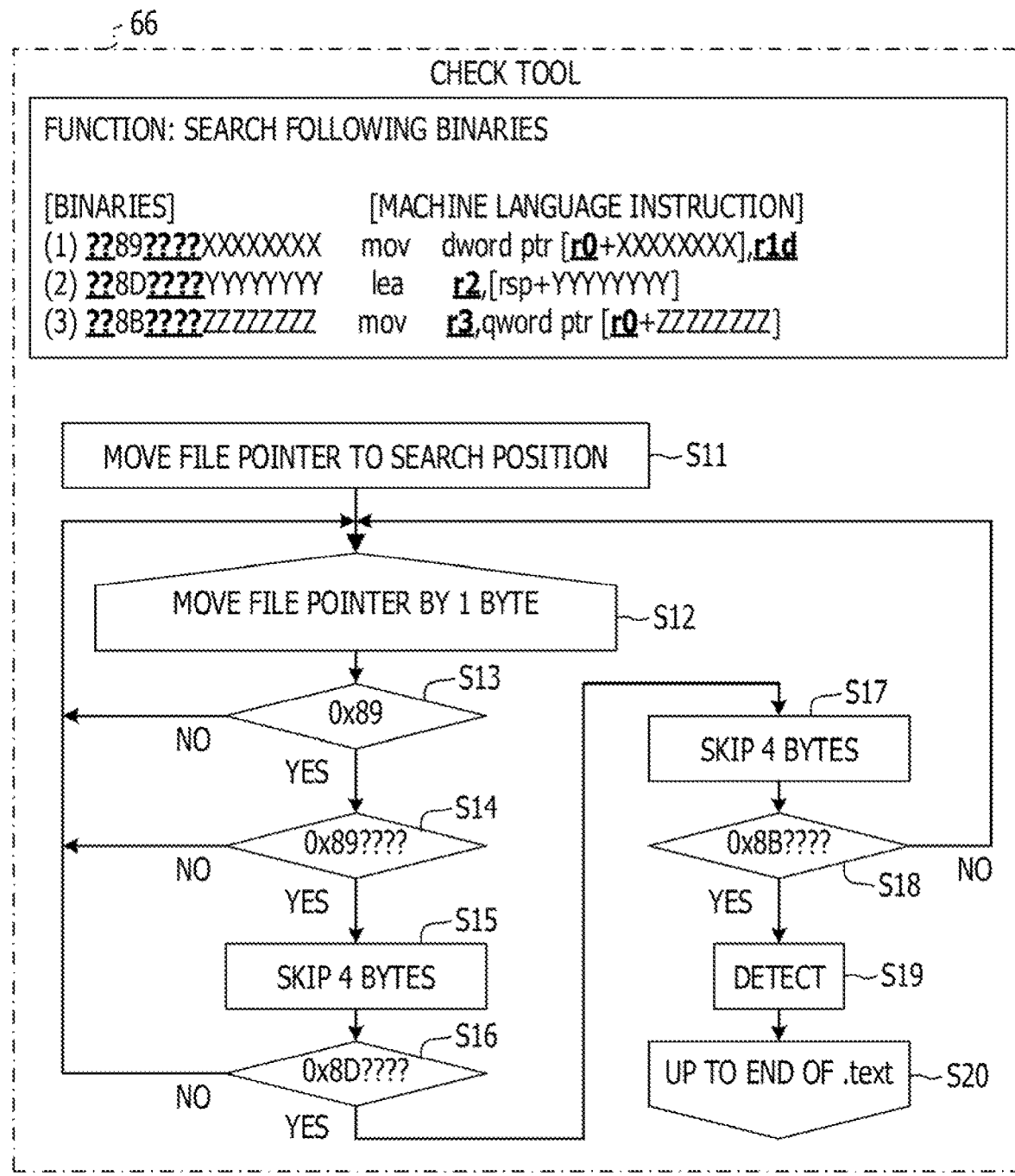
FIG. 4 is a diagram illustrating a process to be performed in a case where register values are variable in the search process illustrated in FIG. 3.

FIG. 4 is a diagram illustrating a process to be performed in a case where a register value is a variable in the search process illustrated in FIG. 3, The check tool 66 illustrated in FIG. 4 searches a binary "??89????XXXXXXXX" corresponding to a machine language instruction "mov dword ptr [r0+XXXXXXXX],r1d" as a search condition (1). The check tool 66 searches a binary "??8D????YYYYYYYY" corresponding to a machine language instruction "lea r2, [rsp+YYYYYYYY]" as a search condition (2). Furthermore, the check tool 66 searches a binary "488B8C24ZZZZZZZZ" corresponding to a machine language instruction "mov r3,qword ptr [r0+ZZZZZZZZ]" as a search condition (3). "XXXXXXXX", "YYYYYYYY", "ZZZZZZZZ", and "??" are arbitrary binaries. "r0", "r1d", "r2", and "r3" are arbitrary strings.

The check tool 66 moves the file pointer to a search position in the program of the application 65 (step S11).

The check tool 66 moves the file pointer byte by byte in the program of the application 65 (step S12).

The check tool 66 decides whether the binary is "0x89" in the program of the application 65 (step S13).

If the binary is not "0x89" (see No route in step S13), the processing returns to step S12.

If the binary is "0x89" (see Yes route in step S13), the check tool 66 decides whether the binary matches "0x89????" of the search condition (1) in the program of the application 65 (step S14).

If the binary does not match the search condition (1) (see No route in step S14), the processing returns to step S12.

On the other hand, if the binary matches the search condition (1) (see Yes route in step S14), the check tool 66 causes the file pointer to skip by four bytes of the arbitrary string "XXXXXXXX" of the condition (1) (step S15).

The check tool 66 decides whether the binary matches "6x8D?.??" of the search condition (2) in the program of the application 65 (step S16).

If the binary does not match the search condition (2) (see No route in step S16), the processing returns to step S12.

If the binary matches the search condition (2) (see Yes route in step S16), the check tool 66 causes the file pointer to skip by four bytes of the arbitrary string "YYYYYYYY" of the condition (2) (step S17).

The check tool 66 decides whether the binary matches "0x8B????" of the search condition (3) in the program of the application 65 (step S18).

If the binary does not match the search condition (3) (see No route in step S18), the processing returns to step S12.

On the other hand, if the binary matches the search condition (3) (see Yes route in step S18), the check tool 66 detects the search target binary (step S19).

Then, the check tool 66 repeatedly executes the processing from step S12 to step S19 up to ".text" that is the end of the search range (step S20).

Figure 5:
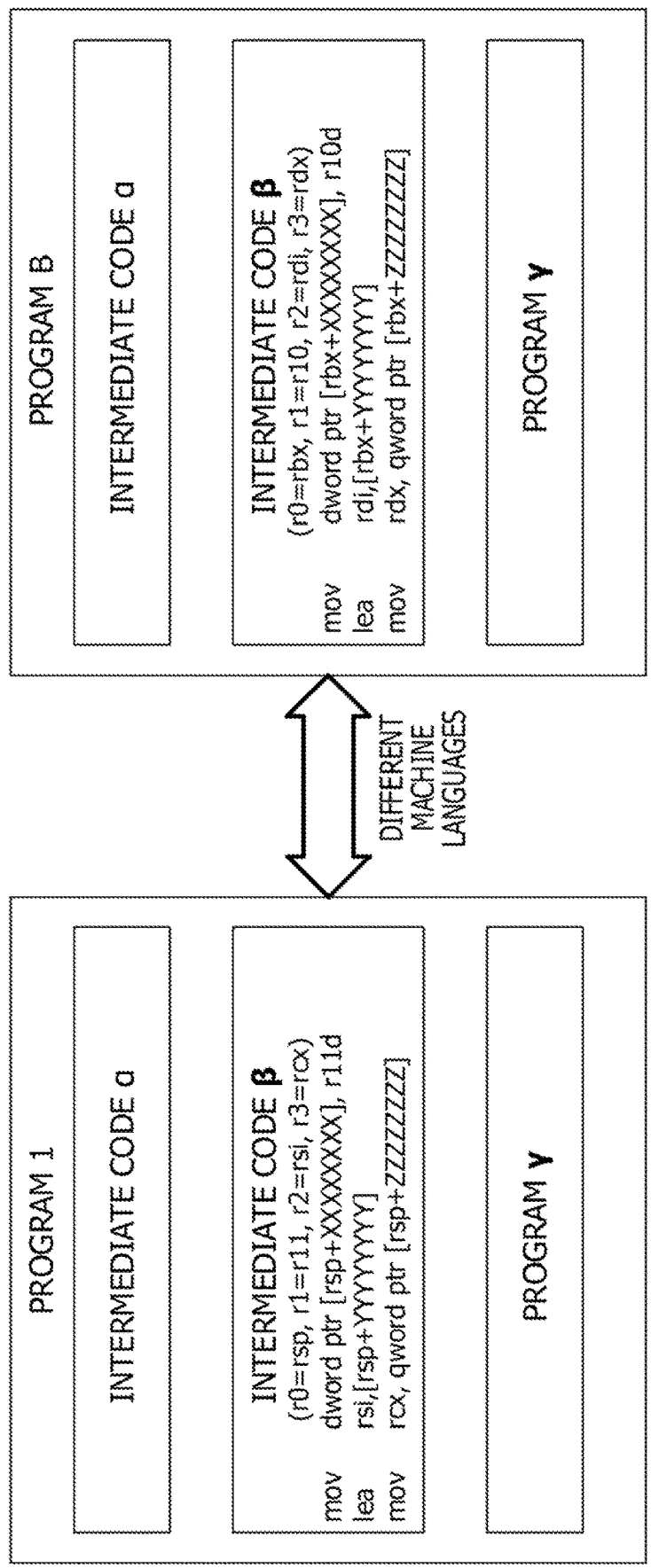
FIG. 5 is a diagram illustrating a difference between machine languages of programs according to a related example.

FIG. 5 is a diagram illustrating a difference between machine languages of programs according to a related example. As illustrated in FIG. 5, both of a program A and a program B have intermediate codes α, β, and γ. However, because, as described in the intermediate codes β, the compiler 61 allocates optimum registers for each program, different machine languages may be generated in the same intermediate codes.

In other words, for example, the format for machine language instructions includes register information, as illustrated in FIG. 4 and FIG. 5. In a case where a machine language instruction with undecided registers is to be searched, the binary matching may not be decided based on information on operation codes (or "instruction part") in the machine language instruction.

Figure 6:
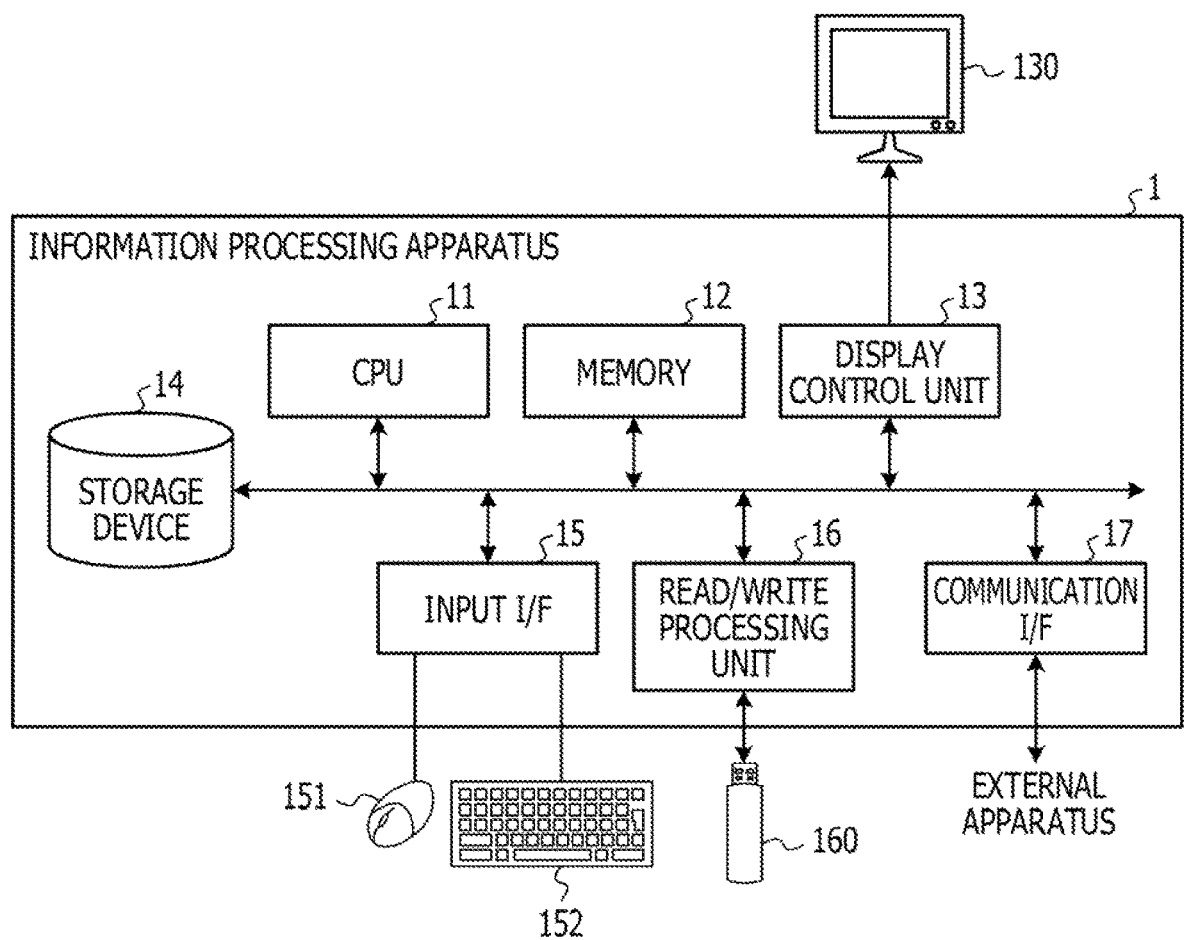
FIG. 6 is a block diagram schematically illustrating a hardware configuration of an information processing apparatus according to an embodiment.

FIG. 6 is a block diagram schematically illustrating a hardware configuration of an information processing apparatus 1 according to an embodiment. The information processing apparatus 1 includes a central processing unit (CPU) 11, a memory 12, a display control unit 13, a storage device 14, an input interface (I/F) 15, a read/write processing unit 16, and a communication I/F 17. The information processing apparatus 1 is an example of a generating apparatus.

The memory 12 is an example of a storage unit and, for example, is a storage device including a read only memory (ROM) and a random access memory (RAM). A program such as a basic input/output system (BIOS) may be written in the ROM in the memory 12. A software program stored in the memory 12 is appropriately read and executed by the CPU 11. The RAM of the memory 12 may be used as a primary recording memory or a working memory.

The display control unit 13 is coupled with a display apparatus 136 and controls the display apparatus 130. The display apparatus 130 is a liquid crystal display, an organic light-emitting diode (OLED) display, a cathode ray tube (CRT) or an electronic paper display, for example, and displays information to an operator. The display apparatus 130 may be combined with an input device and may be a touch panel, for example.

The storage device 14 is a device that readably and veritably stores data and may be a hard disk drive (HDD), a solid state drive (SSD), or a storage class memory (SCM), for example.

The input. I/F 15 is coupled with an input device such as a mouse 151 and a keyboard 152 and controls the input device such as the mouse 151 and the keyboard 152. The mouse 151 and the keyboard 152 are examples of the input device, and an operator performs input operations through those input devices.

The read/write processing unit 16 is configured such that a recording medium 160 may be attached thereto. When the recording medium 160 is attached to the read/write processing unit 16, the read/write processing unit 16 is configured to be capable of reading information recorded in the recording medium 160. In this embodiment, the recording medium 160 is portable. The cording medium 160 may be a flexible disk, an optical disk, a magnetic disk, a magneto-optical disk, a semiconductor memory, or the like.

The communication I/F 17 is an interface that allows communication with an external apparatus.

The CPU 11 is a processing device that performs various controls and operations and executes an operating system (OS) and a program (such as "generation program" and "search program") including a plurality of instructions stored in the memory 12 to implement various functions.

The CPU 11 is an example of a device that controls operations to be performed by the entire information processing apparatus 1. The device is not limited to the CPU 11 but may be any one of an MPU, a DSP, an ASIC, a PLD, and an FPGA, for example. The device that controls operations to be performed by the entire information processing apparatus 1 may be a combination of two of a CPU, an MPU, a DSP, an ASIC, a PLD, and an FPGA. The MPU stands for micro processing unit, and the DSP stands for digital signal processor. The ASIC stands for application specific integrated circuit. The PLD stands for programmable logic device, and the FPGA stands for field programmable gate array.

Figure 7:
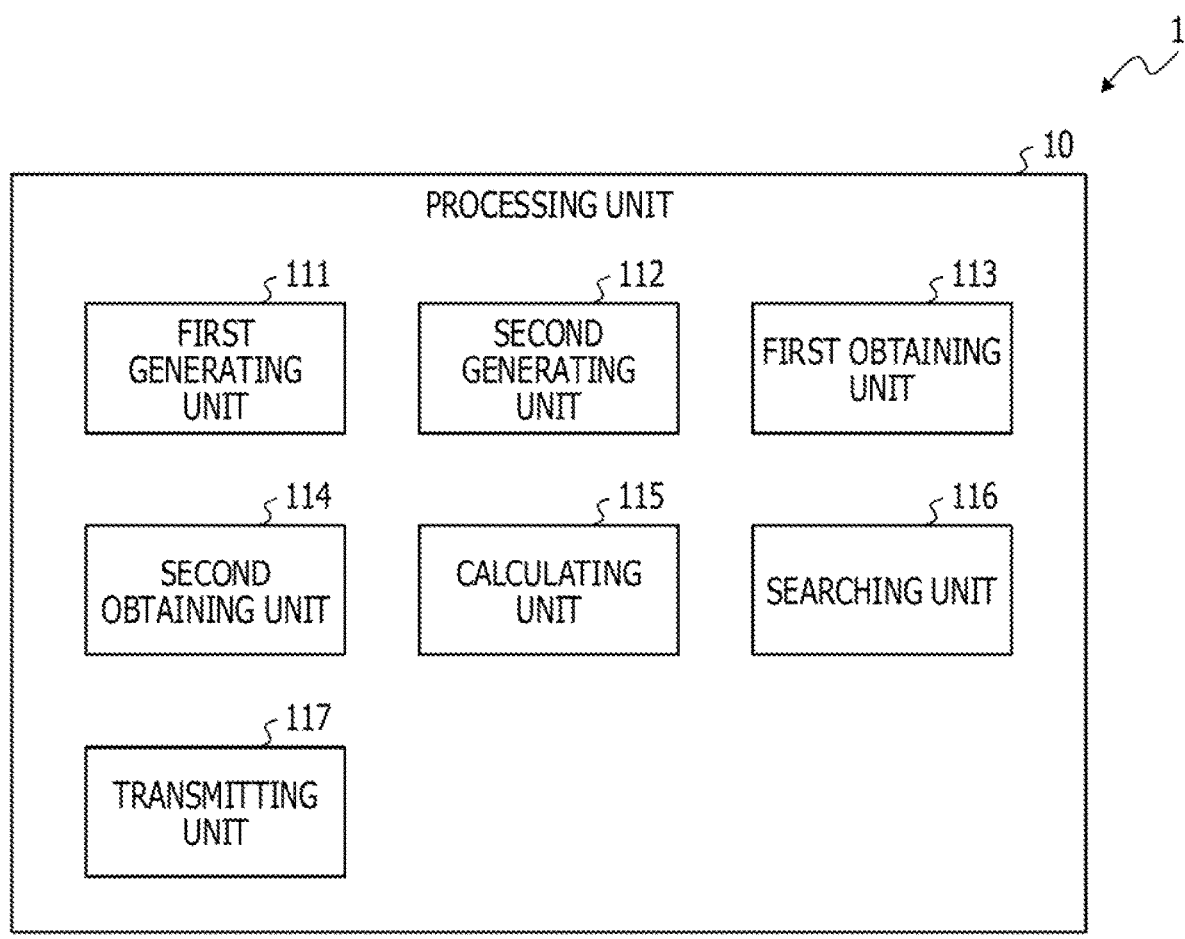
FIG. 7 is a block diagram schematically illustrating a functional configuration of the information processing apparatus illustrated in FIG. 6.

FIG. 7 is a block diagram schematically illustrating a functional configuration of the information processing apparatus 1 illustrated in FIG. 6. The information processing apparatus 1 has functions as a processing unit 10. As illustrated in FIG. 7, the processing unit 10 functions as a first generating unit 111, a second generating unit 112, a first obtaining unit 113, a second obtaining unit 114, a calculating unit 115, a searching unit 116, and a transmitting unit 117.

A generation program that implements the functions of the first generating unit 111, the second generating unit 112, the first obtaining unit 113, the second obtaining unit 114, the calculating unit 115, the searching unit 116, and the transmitting unit 117 is provided in a form recorded in the recording medium 160 as described above, for example. A computer uses the program by reading the program from the recording medium 160 through the read/write processing unit 16 and transferring to and storing in an internal storage device or an external storage device. The program may be recorded in a storage device (recording medium) such as a magnetic disk, an optical disc, or a magneto-optical disc and may be provided from the storage device to the computer via a communication path.

In order to implement the functions as the first generating unit 111, the second generating unit 112, the first obtaining unit 113, the second obtaining unit 114, the calculating unit 115, the searching unit 116, and the transmitting unit 117, the program stored in the internal storage device is executed by a microprocessor in the computer. In this case, the program recorded in the recording medium 160 may be read and executed by the computer. In this embodiment, the internal storage device is the memory 12, and the microprocessor is the CPU 11.

In response to designation of an intermediate code 26 of intermediate codes 26 generated by the compiler 22, the first generating unit 111 generates a machine language instruction 257 corresponding to the designated intermediate code 26 and at least including a variable name.

The compiler 22 and the intermediate codes 26 will be described below with reference to FIG. 8 and so on. Details of functions in the first generating unit 111 will be described below with reference to FIG. 8, FIG. 9, and so on.

In a case where a specific type of variable name is included in the machine language instruction 257 generated by the first generating unit 111, the second generating unit 112 refers to the memory 12 that stores a plurality of binary information pieces (which may also be called "variable value information pieces") being candidates for variable values in association with variable names. The plurality of binary information pieces being candidates for variable values depends on the architecture (such as Intel-related architecture). The second generating unit 112 generates a prediction list 27 for mask values 272 and machine language instruction blocks 273 with the plurality of binary information pieces in which the variable names included in the machine language instructions 257 generated by the first generating unit 111 are associated with variable names.

In a case where a variable name of the type that is not the specific type is included in the machine language instruction generated by the first generating unit 111, the second generating unit 112 generates a prediction list 27 for the mask values 272 and the machine language instruction blocks 273 based on the specific binary information that is the variables of the type that is not the specific type included in the machine language instructions generated by the first generating unit 111.

The prediction list 27 for the mask values 272 and machine language instruction blocks 273 will be described below with reference to FIG. 8, FIG. 10, and so on. Details of functions in the second generating unit 112 will be described below with reference to FIGS. 8 to 10 and so on.

The first obtaining unit 113 obtains the prediction list 27 for the mask values 272 and the machine language instruction blocks 273. The first obtaining unit 113 may obtain lengths 271 of the mask values 272 and the machine language instruction blocks 273. Details of functions in the first obtaining unit 113 will be described below with reference to FIG. 8, FIG. 10, and so on.

The second obtaining unit 114 obtains binary information to be searched in the application 24. The second obtaining unit 114 may extract binary information having a specific length equal to the obtained length from the binary information to be searched. Details of functions in the second obtaining unit 114 will be described below with reference to FIG. 8 and so on.

The calculating unit 115 calculates the AND between the mask value 272 obtained by the first obtaining unit 113 and a part of the binary information to be searched obtained by the second obtaining unit 114. The calculating unit 115 may calculate the AND between the extracted binary information having the specific length and the mask value 272. Details of functions in the calculating unit 115 will be described below with reference to FIG. 8, FIG. 10, and so on.

The searching unit 116 compares the machine language instruction 257 obtained by the first obtaining unit 113 and the AND calculated by the calculating unit 115 to search the specific binary information from the binary information to be searched. Details of functions in the searching unit 116 will be described below with reference to FIG. 8, FIG. 10, and so on.

The transmitting unit 117 transmits the prediction list 27 for the mask values 272 and the machine language instruction blocks 273 generated by the second generating unit 112 to another information processing apparatus (not illustrated).

Figure 8:
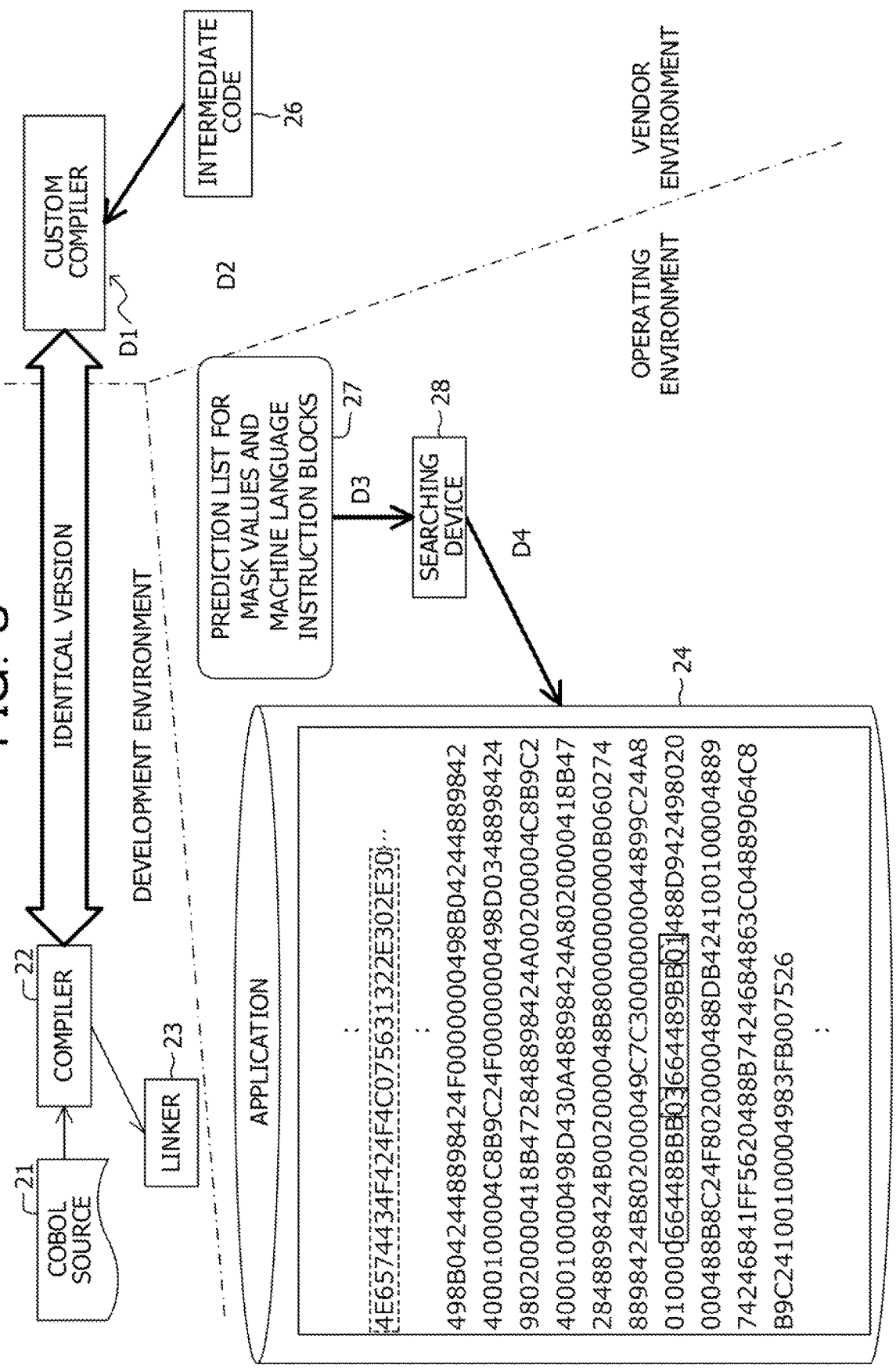
FIG. 8 is a block diagram illustrating a failure investigation process in the information processing apparatus illustrated in FIG. 6.

FIG. 8 is a block diagram illustrating a failure investigation process in the information processing apparatus 1 illustrated in FIG. 6. In a development environment, the compiler 22 compiles a COBOL source 21 to generate a plurality of objects. A linker 23 joins the plurality of generated objects and provides an executable program to the application 24.

Figure 9:
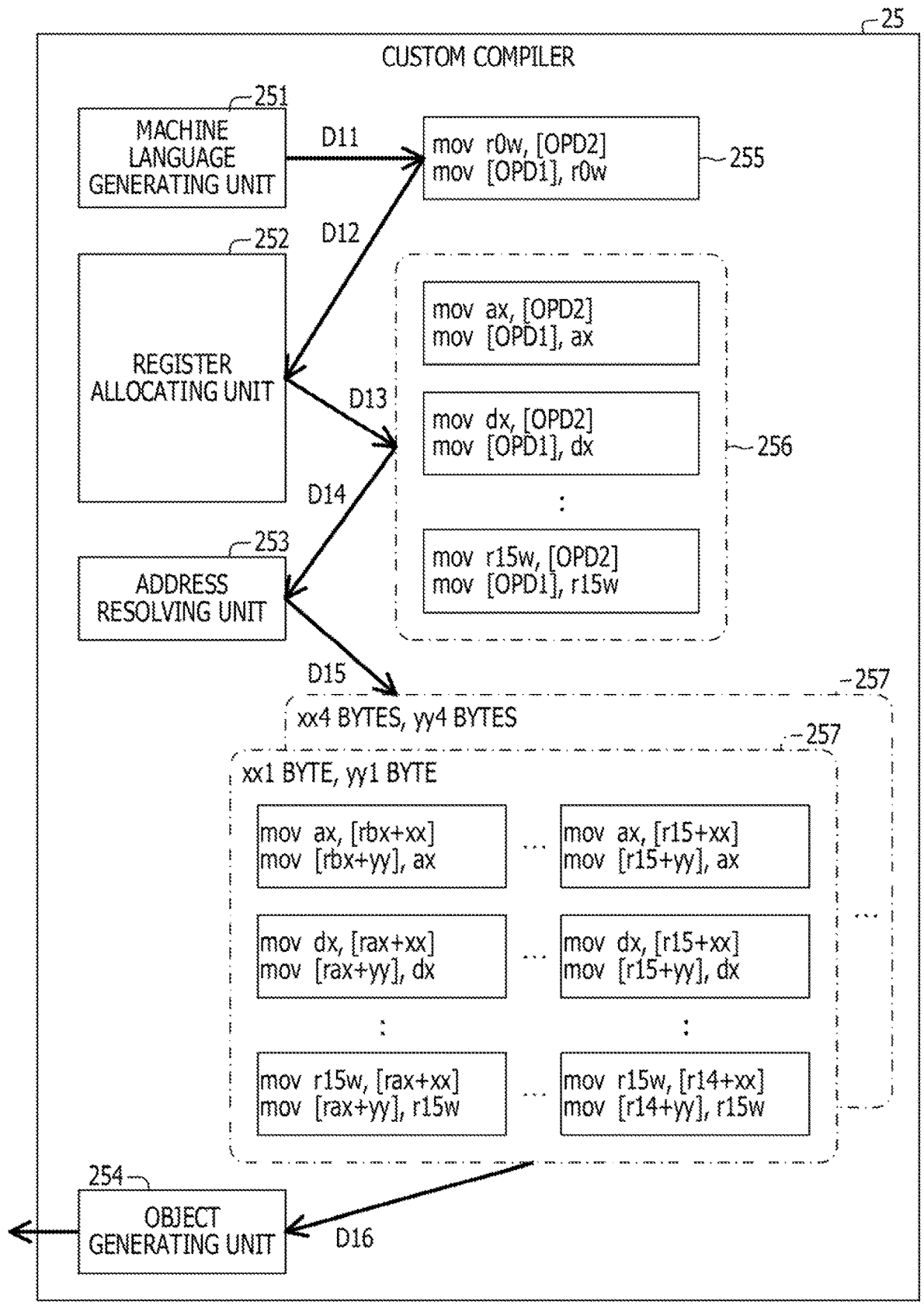
FIG. 9 is a block diagram illustrating details of processing in a custom compiler illustrated in FIG. 8.

In a vendor environment, a custom compiler 25 executes compilation based on the intermediate code 26 (see Reference D1). The compiler 22 and the custom compiler 25 have an identical version, FIG. 9 is a block diagram illustrating details of processing in the custom compiler 25 illustrated in FIG. 8. The custom compiler 25 functions as a machine language generating unit 251, a register allocating unit 252, an address resolving unit 253, and an object generating unit 254.

The machine language generating unit 251, the register allocating unit 252, and the address resolving unit 253 function as examples of the first generating unit 111 illustrated in FIG. 7. The object generating unit 254 functions as an example of the second generating unit 112 illustrated in FIG. 7.

The machine language generating unit 251 generates a prototype 255 of a machine language instruction (or "register unresolved and address unresolved machine language instruction" based on the intermediate code 26 (see Reference D11). The intermediate code 26 includes a pseudo instruction (or "macro instruction") of the machine language defined uniquely by the compiler 22. The intermediate code is filed as a pseudo assembler along with the machine language instruction. In other words, for example, the machine language generating unit 251 expands the pseudo instruction of the machine language to the machine language.

The register allocating unit 252 resolves the registers by obtaining the prototype 255 of the generated machine language instruction (see Reference D12), allocating all registers to a virtual register and generating register allocated machine language instructions 256 (see Reference D13). In the example illustrated in FIG. 9, registers "ax", "dx", . . . , "r15x" are allocated to a virtual register "r0w" in the prototype 255 of the machine language instructions. The registers "ax", "dx", . . . , "r15x" depend on the architecture (such as Intel-related architecture), and an unused register among them is allocated to the virtual register "r0w".

The address resolving unit 253 obtains the generated register allocated machine language instruction 256 (see Reference D14) and generates a machine language instruction 257 with all registers allocated to the base registers and index registers to resolve the address (see Reference D15).

The address resolving unit 253 generates a machine language instruction 257 with an offset "xx" equal to 1 byte and an offset "yy" equal to 1 byte. The address resolving unit 253 generates a machine language instruction 257 with an offset "xx" equal to 1 byte and an offset "yy" equal to 4 bytes. The address resolving unit 253 further generates a machine language instruction 257 with an offset "xx" equal to 4 bytes and an offset "yy" equal to 1 byte. The address resolving unit 253 generates a machine language instruction 257 with an offset "xx" equal to 4 bytes and an offset "yy" equal to 4 bytes.

In the example illustrated in FIG. 9, [rax+xx], "[rbx+xx]", . . . , "[r14x+xx]", "[r15x+xx]" in the machine language instruction 257 with an offset "xx" equal to 1 byte and an offset "yy" equal to 1 byte are allocated to the register "[OPD2]" in the register allocated machine language instruction 256. "[rax+yy]", "[rbx+yy]", ..., "[r14x+yy]", "[r15x+yy]" in the machine language instruction 257 with an offset "xx" equal to 1 byte and an offset "yy" equal to 1 byte are allocated to the register "[OPD1]" in the register allocated machine language instruction 256.

The object generating unit 254 obtains the generated machine language instructions 257 (see Reference D16) and, as illustrated in FIG. 8, generates the prediction list 27 for the mask values 272 and machine language instruction blocks 273 (see Reference D2).

Figure 10:
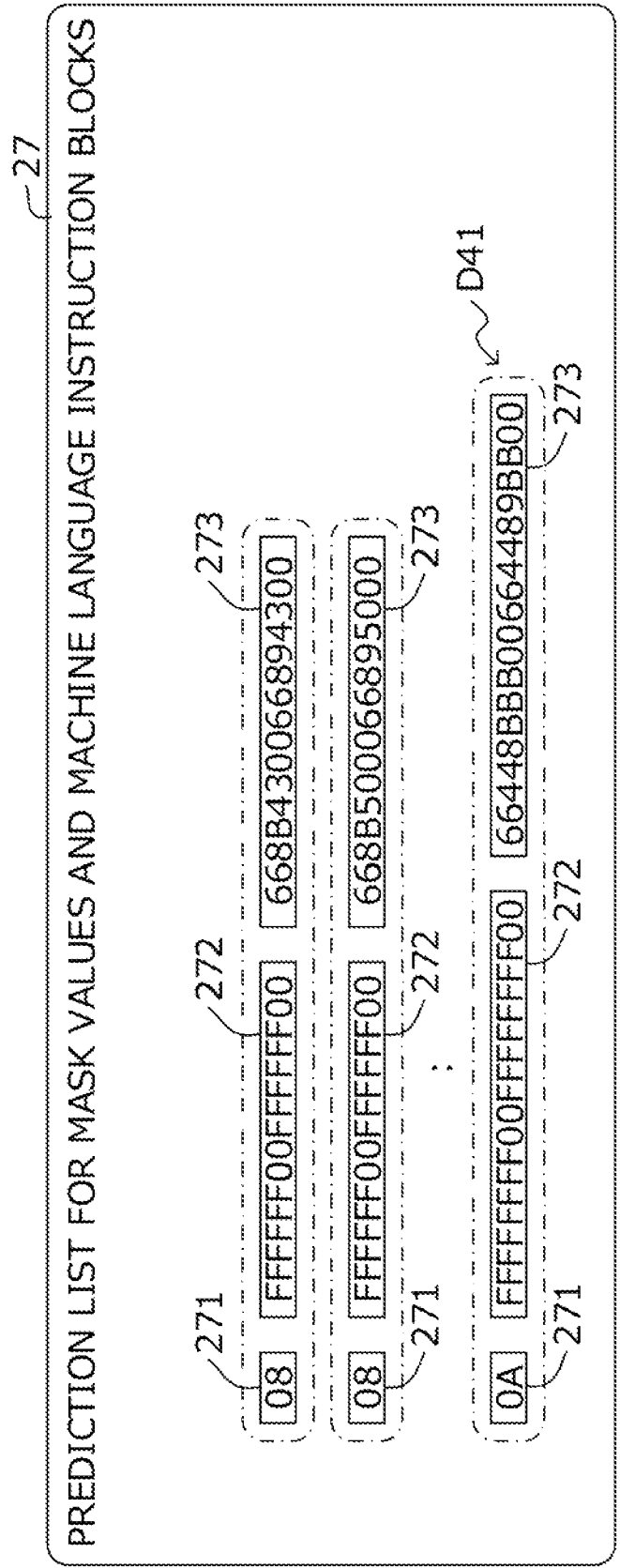
FIG. 10 is a diagram illustrating a specific example of a prediction list for mask values and machine language instruction blocks illustrated in FIG. 8.

FIG. 10 is a diagram illustrating a specific example of the prediction list 27 for the mask values 272 and the machine language instruction blocks 273 illustrated in FIG. 8. The object generating unit 254 generates the prediction list 27 by listing binaries (or "machine language instruction blocks 273"), the mask values 272, and the binary lengths 271 based on the obtained machine language instruction 257.

In the example illustrated in FIG. 10, numerical values representing 8 bytes indicated by "08" and 10 bytes indicated by "0A" are registered with the lengths 271 of the machine language instruction blocks 273. "FFFFFF00FFFFFF00" having a length of 8 bytes and "FFFFFFFF00FFFFFFFF00" having a length of 10 bytes are registered with the mask values 272. Furthermore, "668B430066894300", "668B500066895000", and "66448BBB00664489BB00" are registered with the machine language instruction blocks 273.

In the mask values 272, "0x00" represents a variable part in which an arbitrary value is to be set, and "0xFF" represents a variable part in which a specific value is to be set.

As illustrated in FIG. 8, a searching device 28 obtains the generated prediction list 27 (see Reference D3) and searches a target object in the program of the application 24 (see Reference D4).

In the program of the application 24, the compiler embeds a fixed binary indicating a search starting position as indicated by the broken line frame. The searching device 28 searches the search starting position and refers to the beginning of the target object.

In the example illustrated in FIG. 8, the string detected as a search result is "66448BBB036644898B01" within the solid line frame in the program of the application 24 and corresponds with the AND between the mask value 272 and the machine language instruction block 273 as indicated by Reference D41 in FIG. 10. "03" and "01" within a shaded box in "66448BBB03664489BB01" within the solid line frame are variable parts which may have arbitrary values.

Figure 11:
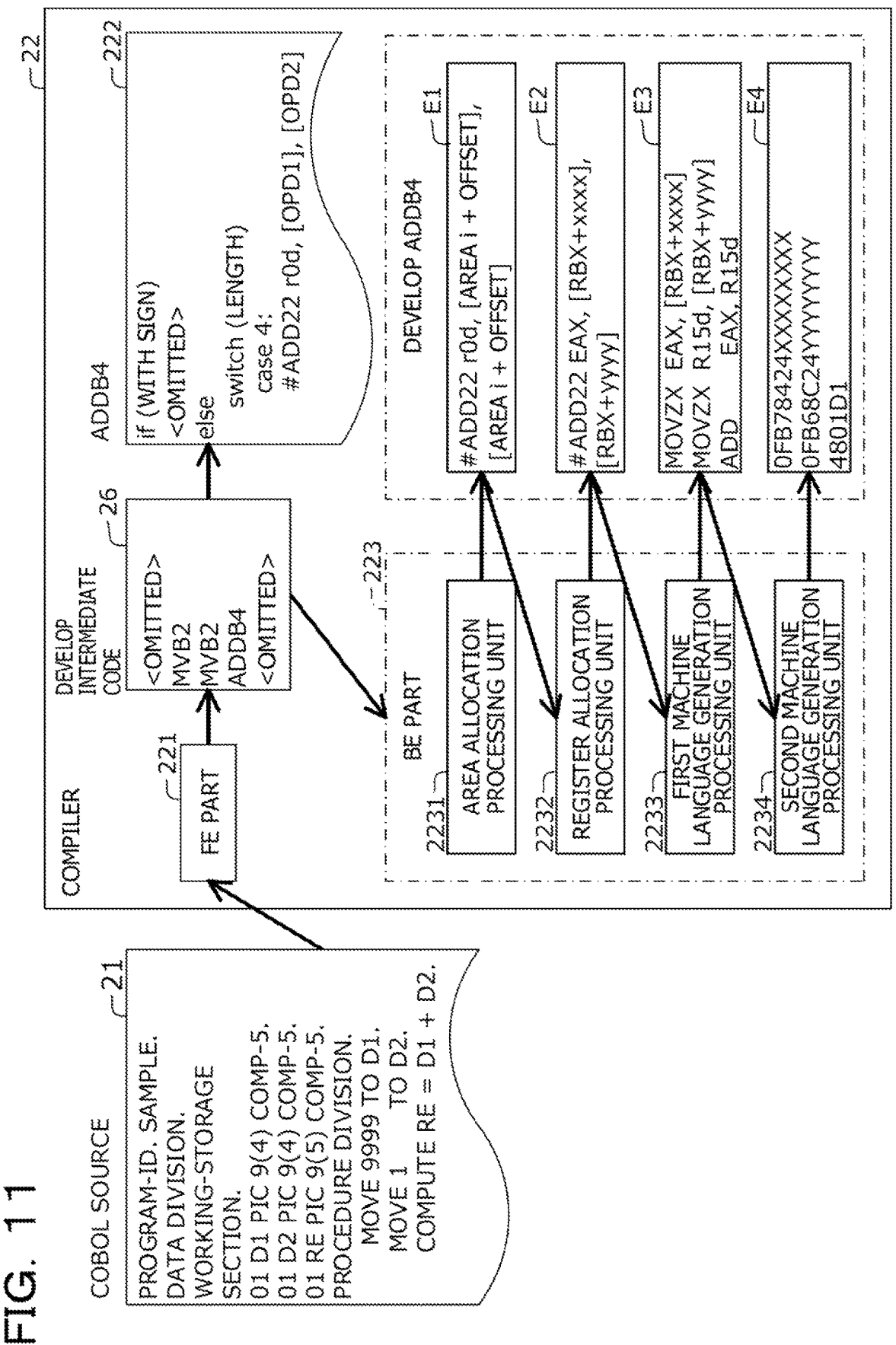
FIG. 11 is a diagram illustrating processing for generating a binary from a COBOL source.

FIG. 11 is a diagram illustrating a process for generating binaries from the COBOL source 21. As illustrated in FIG. 11, the compiler 22 functions as a Frontend (FE) part 221 and a Backend (BE) part 223.

The FE part 221 performs various processes such as a lexical analysis process and a semantic analysis process based on an input COBOL source 21 and expands an intermediate code 26. The expanded intermediate code 26 includes programs such as "MVB2" indicating a binary transcription equal to or lower than 2 bytes and "ADDB4" indicating a binary addition equal to or lower than 4 bytes.

Because the "ADDB4" program 222 is a binary data item and has a length of 4 bytes, "#ADD22 r0d, [OPD1], [OPD2]" is expanded.

The BE part 223 functions as an area allocation processing unit 2231, a register allocation processing unit 2232, a first machine language generation processing unit 2233, and a second machine language generation processing unit 2234.

The area allocation processing unit 2231 determines an area to which data are allocated (see Reference E1). In the example illustrated in FIG. 11, an area i is a data area or a stack area. The offset indicates a distance from the beginning of the area i. In the state indicated by Reference E1, a base register (or "register indicating the beginning of the area") is undecided.

The register avocation processing unit 2232 allocates a virtual register and the base register (see Reference E2). In the example illustrated in FIG. 11, the "[area i+offset]" indicated by Reference E1 is set to "[RBX+xxxx]" and "[RBX+yyyy]".

The first machine language generation processing unit 2233 expands "#ADD22" indicated by Reference E2 to a machine language instruction (see Reference E3).

The second machine language generation processing unit 2234 generates binary information (see Reference E4) based on the machine language instruction indicated by Reference E3.

Figure 12:
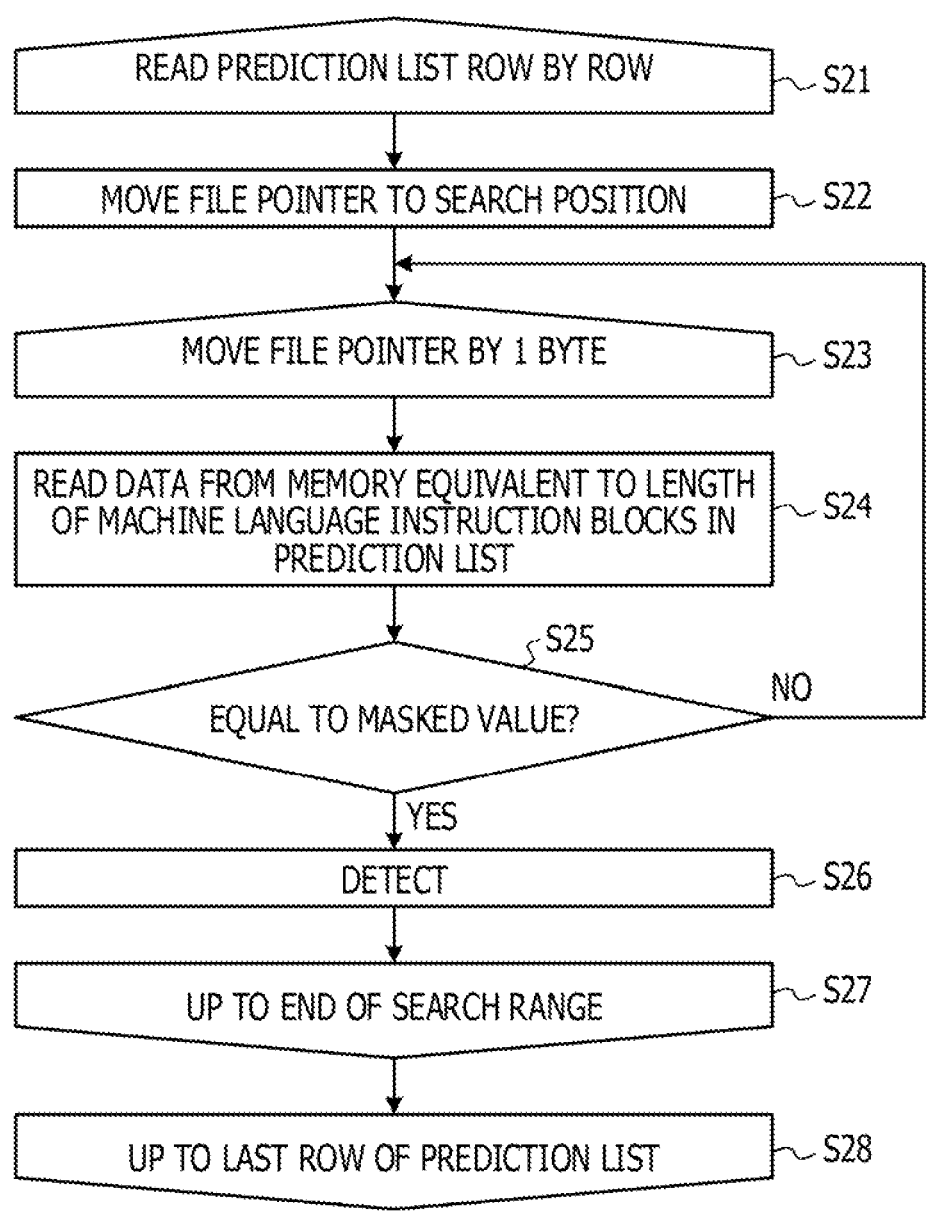
FIG. 12 is a flowchart illustrating the failure investigation process in the information processing apparatus illustrated in FIG. 6.
Figure 13A:
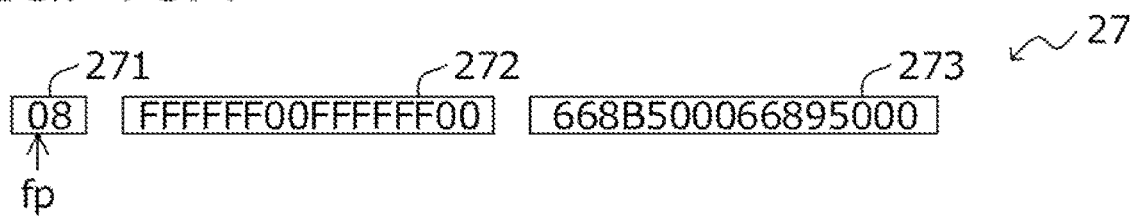
FIGS. 13A to 13C are diagrams illustrating a method for reading a prediction list for mask values and machine language instruction blocks.
Figure 13B:
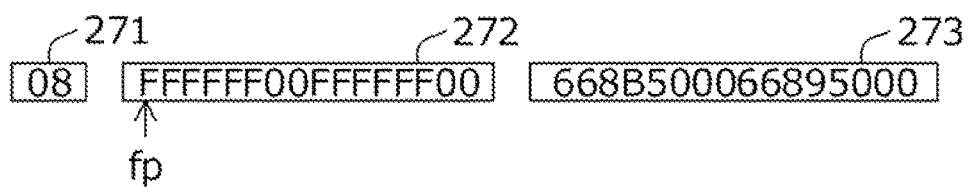
Figure 13C:
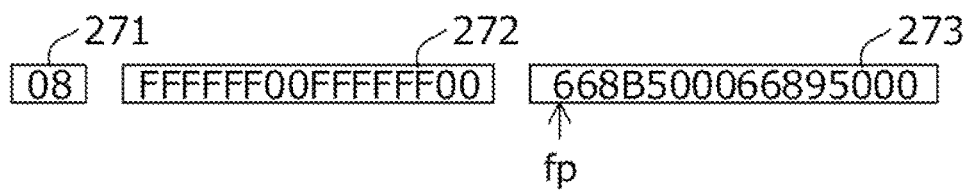
Figure 14:
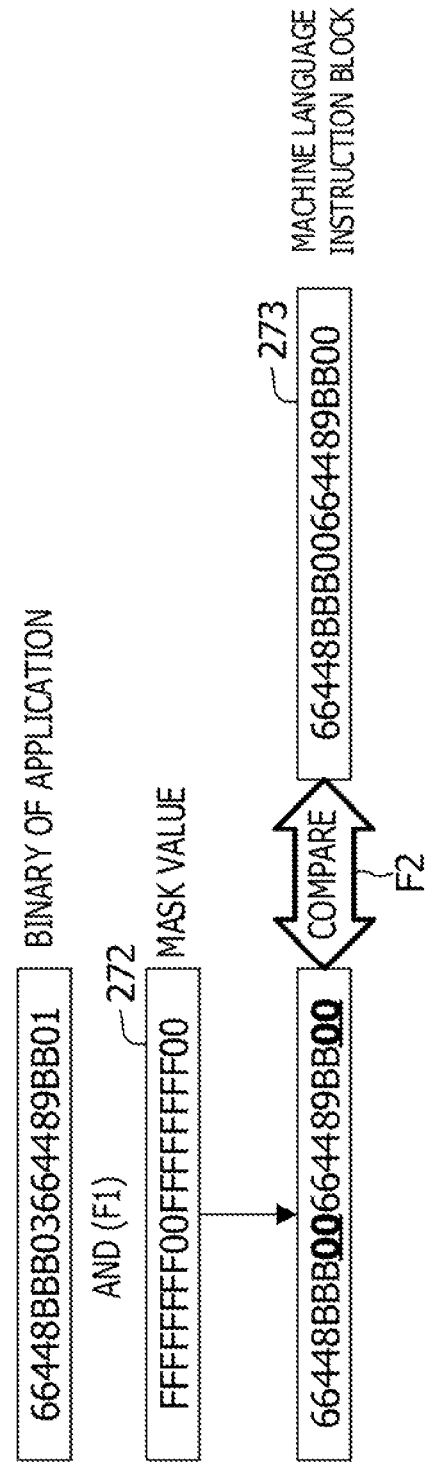
FIG. 14 is a diagram illustrating processing for comparing machine language instruction blocks.

The failure investigation processing in the information processing apparatus illustrated in FIG. 6 will be described by following a flowchart (steps S21 to S28) illustrated in FIG. 12 with reference to FIGS. 13A to 14. FIGS. 13A to 13C are diagrams illustrating a method for reading a prediction list 27 for mask values 272 and machine language instruction blocks 273. FIG. 14 is a diagram illustrating processing for comparing the machine language instruction blocks 273.

The searching device 28 reads the prediction list 27 row by row (step S21).

As indicated in FIG. 13A, a file pointer (fp) is moved to the beginning of the length 271 first at each row of the prediction list 27. Next, as indicated in FIG. 13, the file pointer is moved to the beginning of the mask value 272, and the 8-byte mask value 272 having the length 271 in this example is read. Next, as indicated in FIG. 13C, the file pointer is moved to the beginning of the machine language instruction block 273, and the 8-byte machine language instruction block 273 having the length 271 in this example is read.

The searching device 28 moves the file pointer in the application 24 to a search position (step S22).

The searching device 28 moves the file pointer in the application 24 byte by byte (step S23).

The searching device 28 reads data from the memory 12 recording the program of the application 24 for the length 271 of the machine language instruction block 273 in the prediction list 27 (step S24).

The searching device 28 decides whether the machine language instruction block 273 in the prediction list 27 and the binary in the application 24 after masked with the mask value 272 are equal (step S25).

As illustrated in FIG. 14, the AND between the binary of the application 24 and the mask value 272 is calculated (see Reference F1), Then, the masked binary and the machine language instruction block 273 in the prediction list 27 are compared (see Reference F2).

If the masked value is not equal (see No route in step S25), the processing returns to step S23.

On the other hand, if the masked value is equal (see Yes route in step S25), the searching device 28 detects a binary to be searched from the program of the application 24 (step S26).

The searching device 28 repeats the processing in steps S23 to S26 up to the end of the search range in the program of the application 24.

The searching device 28 repeats the processing in steps S21 to S27 up to the last row of the prediction list 27. The failure investigation process is then ended.

According to the information processing apparatus 1 in the example of the above-described embodiment, for example, the following effects may be obtained.

In response to designation of an intermediate code 26 of intermediate codes 26 generated by the compiler 22, the first generating unit 111 generates a machine language instruction 257 corresponding to the designated intermediate code 26 and at least including a variable name. In a case where a specific type of variable name is included in the machine language instruction 257 generated by the first generating unit 111, the second generating unit 112 refers to the storage device 14 that stores a plurality of binary information pieces being candidates for variable values in association with variable names. The second generating unit 112 generates a prediction list 27 for mask values 272 and machine language instruction blocks 273 with the plurality of binary information pieces in which the variable names included in the machine language instructions 257 generated by the first generating unit 111 are associated with variable names.

Thus, the time for identifying a cause for a failure in a program may be reduced.

In a case where the machine language instructions 257 generated by the first generating unit 111 includes a variable name of the type that is not the specific type, the second generating unit 112 generates a prediction list 27 for the mask values 272 and the machine language instruction blocks 273 with the specific binary information that is the variables of the type that is not the specific type included in the machine language instructions 257 generated by the first generating unit 111.

Thus, because a failure in a process before register allocation may be searched, the range of failures that may be verified by the check tool may be increased.

The transmitting unit 117 transmits the prediction list 27 for the mask values 272 and the machine language instruction blocks 273 generated by the second generating unit 112 to another information processing apparatus.

Thus, also in a case where the functionality as the searching device 28 is provided in an apparatus other than the information processing apparatus 1, searches may be executed in the program of the application 24 in the apparatus other than the information processing apparatus 1.

The first obtaining unit 113 obtains the prediction list 27 for the mask values 272 and the machine language instruction blocks 273. The second obtaining unit 114 obtains binary information to be searched in the application 24. The calculating unit 115 calculates the AND between the mask value 272 obtained by the first obtaining unit 113 and a part of the binary information to be searched obtained by the second obtaining unit 114. The searching unit 116 compares the machine language instruction 257 obtained by the first obtaining unit 113 and the AND calculated by the calculating unit 115 to search the specific binary information from the binary information to be searched.

Thus, the time for identifying a cause for a failure in a program may be reduced.

The first obtaining unit 113 obtains the length 271 for the mask values 272 and the machine language instruction blocks 273, The second obtaining unit 114 extracts binary information having a specific length equal to the obtained length from the binary information to be searched. The calculating unit 115 calculates the AND between the extracted binary information having the specific length and the mask value 272.

Thus, because searches are executed on the machine language instruction 257 block by block (or length by length), the searching time may be reduced.

FIGS. 15A to 15C are diagrams illustrating a comparison between a machine language instruction in a related example and a machine language instruction in an embodiment. More specifically, for example, FIG. 15A is a diagram illustrating an example of a machine language instruction in a related example. FIG. 15B is a diagram illustrating an example of a machine language instruction generated from the intermediate code 26 in a case where a multithread option is designated in an embodiment. FIG. 15C is a diagram illustrating an example of a machine language instruction generated from the intermediate code 26 in a case where a multithread option is not designated in an embodiment.

In a case where the expansion of a machine language instruction depends on information designated by a user, the user designated information such as translation option information written in an object is fully referred. Therefore, the block-by-block searches may not be executed.

For example, in the related example, in order to search the expansion of the machine language instruction illustrated in FIG. 15A, whether a compiler option (MULTOPT) has been designated is checked after a machine language instruction indicated by Reference G1 is detected. If MULTOPT has been designated, matching with a machine language instruction indicated by Reference G2 is determined. If MULTOPT has not been designated, matching with a machine language instruction indicated by Reference G3 is determined.

On the other hand, in the aforementioned embodiment, the intermediate code 26 is used for generating the machine language instruction 257. Because the intermediate code 26 includes information designating how the intermediate code 26 behaves such as option information and environment variables, the machine language instruction 257 generated from the intermediate code 26 is fixed. As illustrated in FIG. 15B, a fixed machine language instruction 257 is generated from the intermediate code 26 in a case where MULTOPT is designated (see References H1 to H3). Also, as illustrated in FIG. 15C, a fixed machine language instruction 257 is generated from the intermediate code 26 in a case where MULTOPT is not designated (see References I1 and I2).

In other words, for example, in the aforementioned embodiment, both of the machine language instructions 257 illustrated in FIGS. 15B and 15C may be given to the searching device 28 to execute searches in the program in both of the cases where MULTOPT is designated and where MULTOPT is not designated.

The disclosed technology is not limited to the aforementioned embodiment but may be implemented by making various changes thereto without departing from the spirit and scope of the embodiment. Each configuration and each process of the present embodiment may be selected as desired or may be combined as appropriate.

Having described that a failure is searched in the application 24 in the COBOL source 21 in the aforementioned embodiment, embodiments are not limited thereto. In the aforementioned embodiment, the failure search may be executed in the application 24 described in various machine languages.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A generation apparatus comprising:
   a memory configured to store variable value information indicating variable value candidates for each variable name, the variable value candidates being determined for each architecture; and
   a processor coupled to the memory and the processor configured to:
   generate a first machine language instruction corresponding to a first code in response to receiving designation of the first code included in codes generated by a compiler, and
   when the generated first machine language instruction includes a first variable name of a specific type, by reference to the variable value information stored in the memory, perform generation of a plurality of machine language instructions based on a plurality of pieces of variable value information associated with each of one or more variable names included in the generated first machine language instruction,
   when the generated first machine language instruction includes a second variable name of a type that is not the specific type, perform generation of a plurality of machine language instructions based on variable value information whose type is not the specific type included in the generated first machine language instruction.

2. The generation apparatus according to claim 1, wherein the codes generated by a compiler are intermediate codes.

3. The generation apparatus according to claim 1, wherein the generation includes generating the plurality of machine language instructions based on a first piece of variable value information in the plurality of pieces of variable value information, and the first piece of variable value information is associated with a first variable name that is not the specific type in the one or more variable names.

4. The generation apparatus according to claim 1, wherein the processor is further configured to transmit the plurality of generated second machine language instructions to a specific computing apparatus.

5. The generation apparatus according to claim 1, wherein the processor is further configured to:
   obtain a mask value and a second machine language instruction,
   calculate an AND operation between the mask value and a part of the second machine language instruction, and
   search the second machine language instruction for specific variable value information by comparing the generated plurality of machine language instructions with a result of the AND operation.

6. The generation apparatus according to claim 5, wherein the processor is further configured to obtain a length of the mask value, and
   the AND operation includes extracting the part of the second machine language instruction having a length equal to the length of the mask value.

7. A computer-implemented generation method comprising:
   generating a first machine language instruction corresponding to a first code in response to receiving designation of the first code included in codes generated by a compiler; and
   when the generated first machine language instruction includes a first variable name of a specific type, by reference to variable value information indicating variable value candidates for each variable name, generating a plurality of machine language instructions based on a plurality of pieces of variable value information associated with each of one or more variable names included in the generated first machine language instruction, the variable value candidates being determined for each architecture,
   when the generated first machine language instruction includes a second variable name of a type that is not the specific type, performing generation of a plurality of machine language instructions based on variable value information whose type is not the specific type included in the generated first machine language instruction.

8. The generation method according to claim 7, wherein the codes generated by a compiler are intermediate codes.

9. The generation method according to claim 7, wherein the generating includes generating the plurality of machine language instructions based on a first piece of variable value information in the plurality of pieces of variable value information, and the first piece of variable value information is associated with a first variable name that is not the specific type in the one or more variable names.

10. The generation method according to claim 7, further comprising:
    transmitting the plurality of generated second machine language instructions to a specific computing apparatus.

11. The generating method according to claim 7, further comprising:
    obtaining a mask value and a second machine language instruction;
    calculating an AND operation between the mask value and a part of the second machine language instruction; and
    searching the second machine language instruction for specific variable value information by comparing the generated plurality of machine language instructions with a result of the AND operation.

12. The generating method according to claim 11, further comprising:
    obtaining a length of the mask value,
    wherein the AND operation includes extracting the part of the second machine language instruction having a length equal to the length of the mask value.

13. A non-transitory computer-readable medium storing instructions executable by one or more computers, the instructions comprising:
    one or more instructions for generating a first machine language instruction corresponding to a first code in response to receiving designation of the first code included in codes generated by a compiler; and
    one or more instructions for, when the generated first machine language instruction includes a first variable name of a specific type, by reference to variable value information indicating variable value candidates for each variable name, generating a plurality of machine language instructions based on a plurality of pieces of variable value information associated with each of one or more variable names included in the generated first machine language instruction, the variable value candidates being determined for each architecture,
    when the generated first machine language instruction includes a second variable name of a type that is not the specific type, performing generation of a plurality of machine language instructions based on variable value information whose type is not the specific type included in the generated first machine language instruction.

14. The non-transitory computer-readable medium according to claim 13, the instructions further comprising:
one or more instructions for, when the first machine language instruction includes a variable name of a type which is different from the specific type, acquiring a mask value and a second machine language instruction by using binary information related to the type which is different from the specific type; and
one or more instructions for calculating a logical conjunction of the mask value and the variable value information.

* * * * *